(12) United States Patent
Millon

(10) Patent No.: US 10,734,618 B2
(45) Date of Patent: Aug. 4, 2020

(54) PRISMATIC-POUCH HYBRID BATTERY MODULE

(71) Applicants:Robert Bosch Battery Systems, LLC, Orion, MI (US); Robert Bosch GmbH, Stuttgart (DE)

(72) Inventor: Christopher Millon, Grand Blanc, MI (US)

(73) Assignees: Robert Bosch Battery Systems LLC, Orion, MI (US); Robert Bosch GmbH, Stuttgart (DE)

( * ) Notice: Subject to any disclaimer, the term of this patent is extended or adjusted under 35 U.S.C. 154(b) by 217 days.

(21) Appl. No.: 15/832,440

(22) Filed: Dec. 5, 2017

(65) Prior Publication Data

US 2019/0173065 A1    Jun. 6, 2019

(51) Int. Cl.
| | |
|---|---|
| *H01M 2/10* | (2006.01) |
| *H01M 10/48* | (2006.01) |
| *H01M 10/6556* | (2014.01) |
| *H01M 10/625* | (2014.01) |

(Continued)

(52) U.S. Cl.
CPC ....... *H01M 2/1077* (2013.01); *H01M 2/0207* (2013.01); *H01M 2/1061* (2013.01);
(Continued)

(58) Field of Classification Search
CPC .. H01M 2/0207; H01M 2/021; H01M 2/0473; H01M 2/1061; H01M 2/1077;
(Continued)

(56) References Cited

U.S. PATENT DOCUMENTS

| 6,743,546 B1 | 6/2004 | Kaneda et al. |
| 8,029,927 B2 | 10/2011 | Tucholski |

(Continued)

FOREIGN PATENT DOCUMENTS

| FR | 3023416 | 1/2016 |
| JP | 10112296 A  * | 4/1998 |

(Continued)

OTHER PUBLICATIONS

EPO Website Machine Translation of the detailed description of JP 10-112296A. (Year: 1998).*

(Continued)

*Primary Examiner* — Gregg Cantelmo
(74) *Attorney, Agent, or Firm* — Kelly McGlashen; Maginot, Moore & Beck LLP

(57) ABSTRACT

A battery module incorporates features of both prismatic housings and metal foil laminate pouch housings, and is configured to receive and support electrochemical cells. The battery module housing includes a rigid tubular frame and flexible cover elements that are joined to the frame and close the open ends of the frame. The frame has an inner surface that faces the cells, an outer surface that is opposed to the inner surface, a first edge that joins the inner surface to the outer surface at one open end of the frame, and a second edge that joins the inner surface to the outer surface at the opposed open end of the frame. The first cover element overlies and closes the one open end of the frame and the second cover element overlies and closes the other open end of the frame.

10 Claims, 4 Drawing Sheets

(51) Int. Cl.
*H01M 10/613* (2014.01)
*H01M 2/02* (2006.01)
*H01M 10/647* (2014.01)
*H01M 2/04* (2006.01)
*H01M 10/6567* (2014.01)

(52) U.S. Cl.
CPC ....... *H01M 10/482* (2013.01); *H01M 10/613* (2015.04); *H01M 10/625* (2015.04); *H01M 10/6556* (2015.04); *H01M 2/021* (2013.01); *H01M 2/0473* (2013.01); *H01M 10/48* (2013.01); *H01M 10/647* (2015.04); *H01M 10/6567* (2015.04); *H01M 2220/20* (2013.01)

(58) Field of Classification Search
CPC .. H01M 10/48; H01M 10/482; H01M 10/613; H01M 10/625; H01M 10/647; H01M 10/6556; H01M 10/6567; H01M 2220/20
See application file for complete search history.

(56) References Cited

U.S. PATENT DOCUMENTS

| | | |
|---|---|---|
| 8,518,569 B2 | 8/2013 | Murphy et al. |
| 8,835,037 B2 | 9/2014 | Nguyen et al. |
| 2004/0067416 A1 | 4/2004 | MacLean |
| 2004/0106038 A1* | 6/2004 | Shimamura ........... H01M 2/021 429/152 |
| 2005/0287430 A1* | 12/2005 | Kim ................. H01M 2/06 429/161 |
| 2012/0040223 A1* | 2/2012 | Odumodu ........... H01M 2/1077 429/120 |
| 2012/0141844 A1* | 6/2012 | Lamm ................ H01M 2/0207 429/56 |
| 2017/0317324 A1* | 11/2017 | Westermeier ....... H01M 2/0237 |

FOREIGN PATENT DOCUMENTS

| | | | |
|---|---|---|---|
| JP | 2008146963 | 6/2008 | |
| WO | WO-2016083144 A1 * | 6/2016 | .......... H01M 2/0237 |
| WO | 2017039352 | 3/2017 | |
| WO | 2017140623 | 8/2017 | |

OTHER PUBLICATIONS

Partial certified translation of JP 10-112296A (translation of paragraph [0016]). (Year: 1998).*

* cited by examiner

PRISMATIC-POUCH HYBRID BATTERY MODULE

FIELD

The disclosure relates generally to battery module that includes electrochemical cells enclosed within a hybrid housing, the housing incorporating features of both prismatic housings and metal foil laminate pouch housings.

BACKGROUND

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. Within the battery modules, the cells are arranged in two or three dimensional arrays and are electrically connected in series or in parallel. Likewise, the battery modules within a battery pack are electrically connected in series or in parallel.

SUMMARY

In some aspects, a battery module includes a battery module housing and electrochemical cells disposed in the cell housing. The electrochemical cells may be arranged in a cell stack, and each cell includes a positive electrode, a negative electrode and a separator, where the separator is sandwiched between the positive electrode the negative electrode and prevents physical contact between the positive electrode and the negative electrode. The battery module housing includes a rigid frame that surrounds a circumference of the cell stack. The frame has an inner surface that faces the cell stack, an outer surface that is opposed to the inner surface, a first edge that joins the inner surface to the outer surface at one end of the cell stack, and a second edge that joins the inner surface to the outer surface at an other end of the cell stack. The battery module housing includes a first cover element and a second cover element. The first cover element is formed of a metal foil laminate material. In addition, the first cover element overlies the one end of the cell stack and a peripheral edge of the first cover element is joined to the frame along the entirety of the peripheral edge of the first cover element. The second cover element is formed of a metal foil laminate material. The second cover element overlies the other end of the cell stack, and a peripheral edge of the second cover element is joined to the frame along the entirety of the peripheral edge of the second cover element. The first cover element, the second cover element and the frame cooperate to form a module housing that contains the cell stack.

In some embodiments, the first cover element is sealed to the frame along the entirety of the peripheral edge of the first cover element, and the second cover element is sealed to the frame along the entirety of the peripheral edge of the second cover element. As a result, the first cover element, the second cover element and the frame cooperate to form a sealed module housing that contains the cell stack.

In some embodiments, an interior space of the module housing is at a pressure that is less than atmospheric pressure.

In some embodiments, the frame comprises at least one port that is configured to permit fluid flow through the frame when the port is in an open configuration, and that is configured to prevent fluid flow through the frame when the port is in a closed configuration.

In some embodiments, the frame comprises at least one sensor that is configured to detect an operating property of at least one cell of the cell stack.

In some embodiments, the frame comprises an electrically conductive terminal. The terminal includes a first end that protrudes inward from the inner surface of the frame and is in electrical contact with one of the positive electrode and the negative electrode of at least one cell, and includes a second end that protrudes outward from the outer surface of the frame.

In some embodiments, the first cover element is joined to the first edge along the entirety of the peripheral edge of the first cover element, and the second cover element is joined to the second edge along the entirety of the peripheral edge of the second cover element.

In some embodiments, the frame includes integral mounting features that are configured to allow the frame to be secured to a support structure.

In some embodiments, the frame includes a terminal opening configured to permit pass through of a terminal that is electrically connected to at least one cell, and a seal disposed in the terminal opening configured to prevent fluid flow between the terminal and the terminal opening.

In some embodiments, the frame includes a cooling channel that extends between a first cooling channel opening and a second cooling channel opening, the cooling channel defining a fluid flow pathway within the frame.

In some aspects, a battery module includes a battery module housing that is configured to receive and support an array of electrochemical cells. The battery module housing includes a frame, and first and second cover elements. The frame is rigid and surrounds a circumference of the cell array. The frame has an inner surface that faces the cell array, an outer surface that is opposed to the inner surface, a first edge that joins the inner surface to the outer surface at one end of the cell array, and a second edge that joins the inner surface to the outer surface at an other end of the cell array. The first cover element is formed of a metal foil laminate material. The first cover element overlies the one end of the cell array, and a peripheral edge of the first cover element is joined to the frame along the entirety of the peripheral edge of the first cover element. In addition, the second cover element is formed of a metal foil laminate material. The second cover element overlies the other end of the cell array, and a peripheral edge of the second cover element is joined to the frame along the entirety of the peripheral edge of the second cover element. The first cover element, the second cover element and the frame cooperate to form a module housing that contains the electrochemical cells.

In some aspects, a battery module incorporates features of both prismatic housings and metal foil laminate pouch housings, and is configured to receive and support electrochemical cells. The battery module housing includes a rigid tubular frame and flexible cover elements that are joined to the frame and close the open ends of the frame. The frame has an inner surface that faces the cells, an outer surface that is opposed to the inner surface, a first edge that joins the inner surface to the outer surface at one open end of the frame, and a second edge that joins the inner surface to the outer surface at the opposed open end of the frame. The first cover element overlies and closes the one open end of the frame and the second cover element overlies and closes the other open end of the frame.

A feature of the battery module housing that is common to a metal foil laminate pouch housing is use of the first and, second, cover elements, which provide a flexible housing portion at locations corresponding to opposed ends of the frame. The first and second cover elements, which are made of a flexible metal foil laminate material, enable the battery module to accommodate changes in cell dimension ("cell growth") that occurs during cell operation. As a result, cell damage can be avoided which sometimes occurs when cells are stored in a completely rigid housing, for example a prismatic housing.

A feature of the battery module housing that is common to a prismatic housing is use of the rigid frame that surrounds cells disposed within the battery module housing. The frame, which supports and protects the cells disposed within the battery module housing, can be manufactured in any height as required by the specifics of the application, and thus allows storage of a cell stack that is tall relative to that of a pouch cell, which has a limited height due to the drawing properties of the metal foil laminate material. That is, the battery module housing disclosed herein does not require drawing of the metal foil laminate material, whereby some issues associated with forming pouch cells in a deep drawing process (for example, draw depth limitations, material damage due to drawing, sealing of complex joints in the pouch material) are avoided.

The first and second cover elements are provided as sheets that are joined to flat surfaces of the frame in a heat sealing process. As a result, the sealed joints are simple and easy to form, and thus are reliable. Moreover, since the first and second cover elements are sealed directly to the frame, the battery module housing is free of flanges that are associated with folding and sealing metal foil laminate material into a pouch configuration. As a result, the packing efficiency of the battery module with other battery module within a battery pack is improved.

The rigid frame permits ancillary structures such as terminals, valved ports and/or sensors to be easily and securely mounted in close proximity to the cells. Due to the rigidity of the frame, sealing of the ancillary structures within the module housing becomes less complex and more reliable than when providing such structures in a pouch type housing.

The details of one or more features, aspects, implementations, and advantages of this disclosure are set forth in the accompanying drawings, the detailed description, and the claims below.

DETAILED DESCRIPTION

Figure 1:
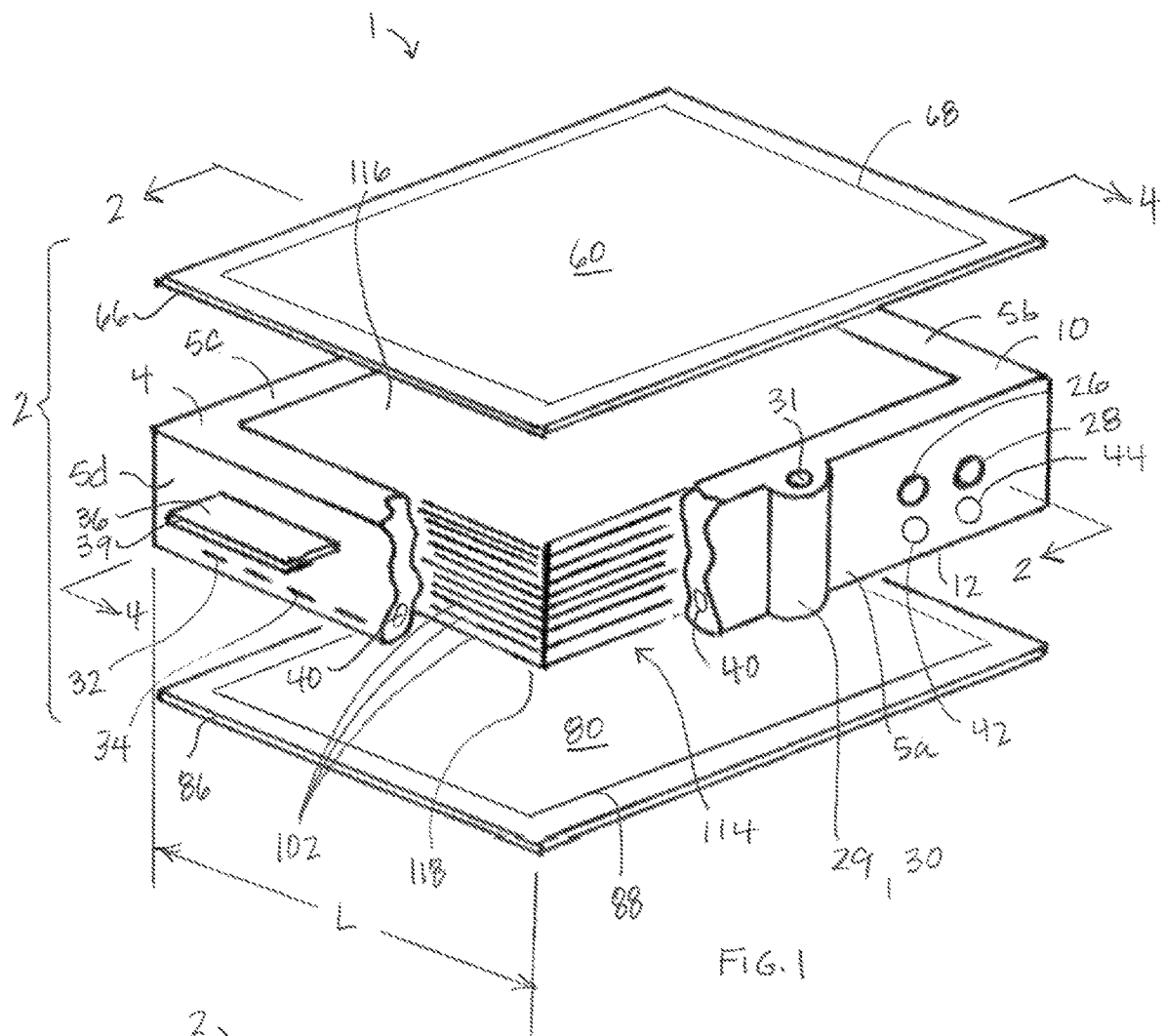
FIG. 1 is an exploded perspective view of a battery module including a battery module housing and a stack of electrochemical cells disposed in the housing.
Figure 2:
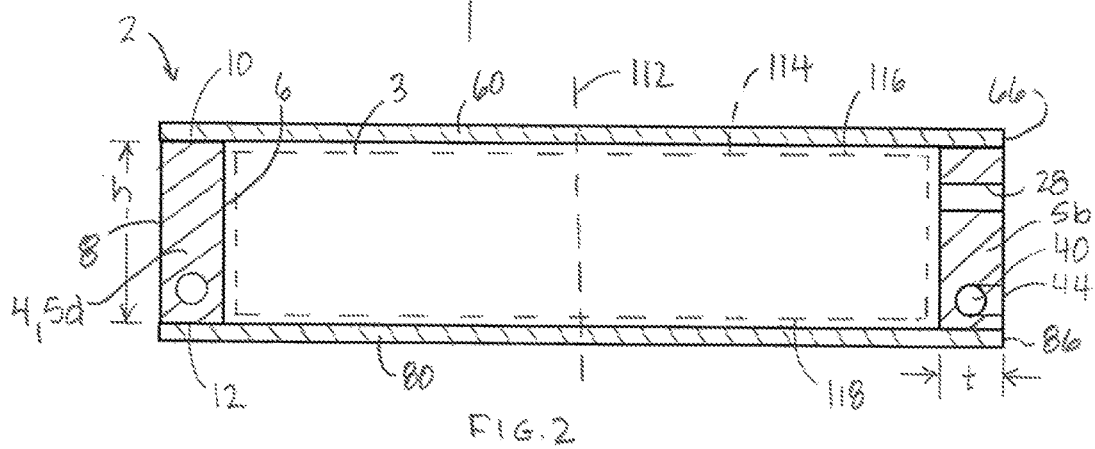
FIG. 2 is a cross-sectional view of the battery module housing as seen across line 2-2 of FIG. 1.

Referring to FIGS. 1 and 2, a battery module 1 is an energy storage device that includes electrochemical cells 102 that are electrically interconnected and stored in an organized manner within a battery module housing 2. The cells 102 can be arranged within the module housing 2, for example by stacking. Within the battery module housing 2, cells 102 are electrically connected in series or in parallel. Several battery modules 1 may be disposed in a battery pack housing (not shown) to form a battery pack, and within the battery pack housing, the battery modules 1 are electrically connected in series or in parallel. The battery module housing 2 has characteristics of both a prismatic design and a pouch design, as described in detail below.

Figure 3:
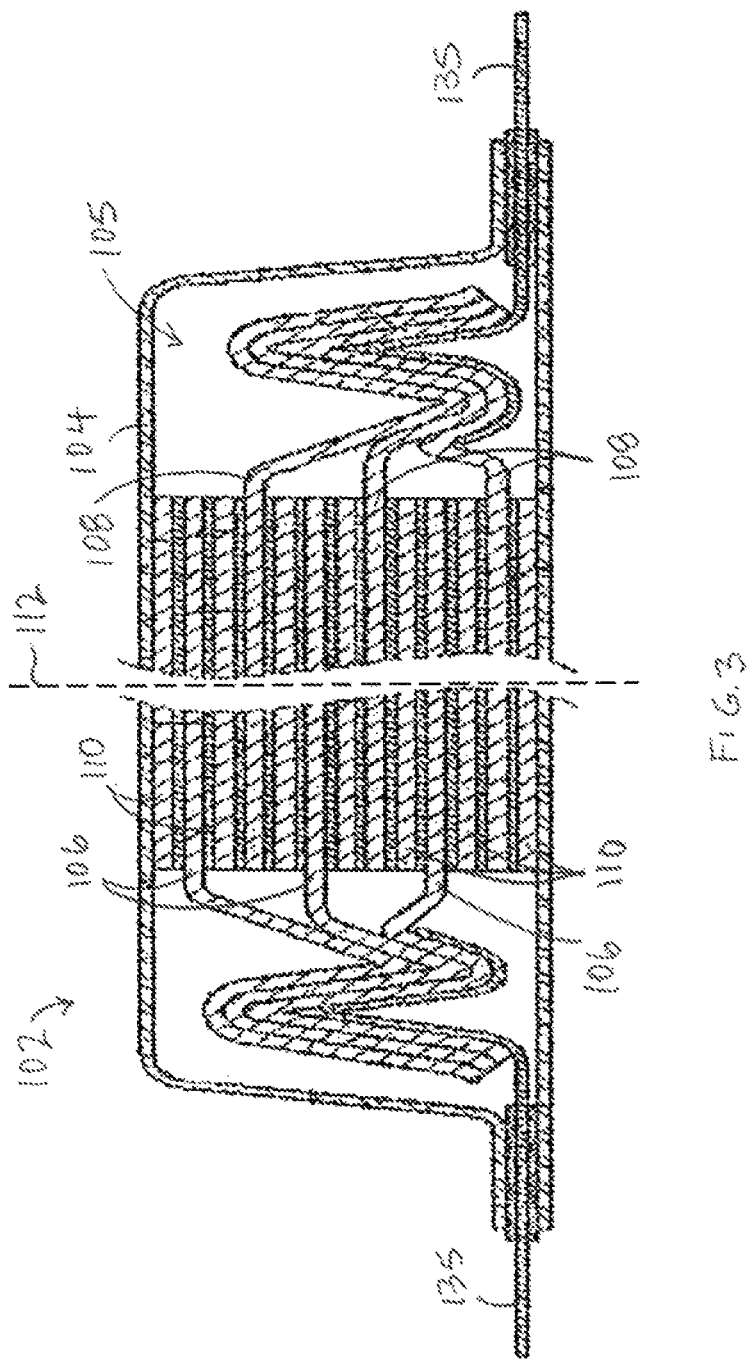
FIG. 3 is a cross-sectional view of an electrochemical cell.

Referring to FIG. 3, each cell 102 includes a cell housing 104 and an electrode assembly 105 that is sealed within the cell housing 104. The cell housing 104 is a pouch-type housing formed of a metal foil laminated between thin plastic layers to form a thin film that is folded and sealed in the form of a flexible pouch. In the illustrated embodiment, the cell housing 104 has a low profile, rectangular shape but is not limited to this configuration.

The electrode assembly 105 disposed in the cell 102 includes a series of stacked individual positive electrode plates (e.g., positive electrodes) 106 alternating with individual negative electrode plates (e.g., negative electrodes) 108 and separated by an intermediate separator plate (e.g., separator) 110. The positive electrodes 106, the negative electrodes 108 and the separators 110 form a cell stack that is aligned along an electrode stacking axis 112.

The positive and negative electrodes 106, 108 may each have a layered structure to facilitate insertion and/or movement of lithium-ions. For example, in the illustrated embodiment, the positive electrode 106 includes a first substrate (not shown) formed of a first electrically-conductive material such as copper. In addition, the positive electrode 106 includes a first active material (not shown) such as graphite disposed on at least one side of the first substrate. The first active material is provided on the first substrate for example in a printing process.

The negative electrode 108 includes a second substrate (not shown) formed of a second electrically-conductive material such as aluminum. In addition, the negative electrode 108 includes a second active material (not shown) such as a lithiated metal oxide coating disposed on at least one side of the second substrate. The second active material is provided on the second substrate for example in a printing process.

The separator 110 is a permeable membrane that functions to keep the positive and negative electrodes 106, 108 apart to prevent electrical short circuits while also allowing passage of ionic charge carriers provided in the electrolyte and that are needed to close the circuit during the passage of current within the cell 102. The separator 110 is formed of an electrically insulating material such as a tri-layer polypropylene-polyethylene-polypropylene membrane.

Referring again to FIGS. 1 and 2, the cells 102 are arranged in a two or three dimensional array within the battery module housing 2, for example in an aligned, stacked arrangement referred to as cell stack 114. Within the cell stack 114, a stacking direction of the cells 102 is parallel to the electrode stacking axis 112.

The battery module housing 2 includes a frame 4, a first cover element 60 and a second cover element 80 that cooperate to form a closed, sealed container that houses the cell stack 114.

The frame 4 is a rigid, rectangular, tubular structure that surrounds (e.g., completely encircles) a circumference of the cell stack 114. The frame 4 includes four beam elements 5a, 5b, 5c, 5d connected at opposed ends to form a wall structure that is open at each end (e.g., to form closed section). The frame 4 has an inner surface 6 that faces the cell stack 114, and an outer surface 8 that is opposed to the inner surface 6. The frame 4 includes a first edge 10 that joins the inner surface 6 to the outer surface 8 at one end 116 of the cell stack 114, and a second edge 12 that joins the inner surface 6 to the outer surface 8 at an opposed end 118 of the cell stack 114.

In some embodiments, the frame 4 is formed of an electrically non-conductive plastic. In other embodiments, the frame 4 is formed of metal. The frame 4 is sufficiently rigid to physically support the cell stack 114 and retain the cell stack 114 in a desired position and orientation during use. In addition, the frame 4 may be sufficiently rigid to prevent deformation of the cells 102 within the cell stack 114 due to impacts which may occur in the course of normal handling and use, as well as during extreme conditions such as can occur if the battery module 1 is dropped.

The frame 4 is thin walled in that a thickness t of the frame 4 is small relative to both a height h of the frame 4 and a length L of a beam 5 (or alternatively, of a circumference of the frame 4), where the frame thickness t corresponds to a distance between the frame inner surface 6 and the frame outer surface 8, the frame height h corresponds to a distance between the first edge 10 and the second edge 12, and the beam length L is measured in a direction transverse to the thickness and height directions. The frame height h is set to correspond to, or be slightly greater than, a height of the cell stack 114.

The frame 4 includes first and second cover elements 60, 80 that close the opposed frame open ends. The first cover element 60 is formed of a metal foil laminate material, and overlies the one end 116 of the cell stack 114. The first cover element 60 has a size and shape that corresponds to the size and shape defined by the first edge 10 of the frame 4. The peripheral edge 66 of the first cover element 60 is sealed to the first edge 10 of the frame 4 along the entirety of the peripheral edge 66 of the first cover element 60. For example, in some embodiments, a heating element can be used to form a seal line 68 that joins the first cover element 60 to the frame first edge 10. The seal line 68 extends along the entire length of the first edge 10 to form a closed loop, whereby the first cover element 60 closes and seals the one end of the frame 4.

Similarly, the second cover element 80 is formed of a metal foil laminate material, and overlies the opposed end 118 of the cell stack 114. The second cover element 80 has a size and shape that corresponds to the size and shape defined by the second edge 12 of the frame 4. A peripheral edge 86 of the second cover element 80 is sealed to the second edge 12 of the frame 4 along the entirety of the peripheral edge 86 of the second cover element 80. For example, in some embodiments, a heating element can be used to form a seal line 88 that joins the second cover element 80 to the frame second edge 12. The seal line 88 extends along the entire length of the second edge 12 to form a closed loop, whereby the second cover element 80 closes and seals the opposed end of the frame 4.

The metal foil laminate material is a multi-layer material that includes a central layer of metal foil, for example aluminum foil, that is sandwiched between a layer of polyamide and a layer of polypropylene. In one example, the metal foil laminate material may have the following three layers which are joined by a thin adhesive between adjacent layers: oriented nylon/aluminum foil/polypropylene. In another example, the metal foil laminate material may have the following four layers which are joined by a thin adhesive between adjacent layers: polyethylene terephthalate/oriented nylon/aluminum foil/polypropylene. Due to this construction, the metal foil laminate material is a flexible sheet. By providing the cover elements 60, 80, formed of the metal foil laminate material on each end of the frame 4, arranged so that the cover elements lie transverse to the cell and electrode stacking directions (e.g., transverse to the electrode stacking axis 112), the battery module 1 is configured to accommodate changes in cell dimension ("cell growth") that occurs during cell operation, whereby cell damage can be avoided which sometimes occurs when cells are stored in a completely rigid housing.

Since the first and second cover elements 60, 80 close and seal the opposed open ends of the frame 4, the module housing 2 defines a sealed interior space 3. In some embodiments, the interior space 3 of the module housing 2 is at a pressure that is less than atmospheric pressure. By providing a vacuum within the module housing 2, the structural integrity of the battery module 1 may be improved relative to a similar structure that is not under vacuum.

The frame 4 may include valved ports that are configured to permit fluid flow through the frame 4 between the frame inner and outer surfaces 6, 8. For example, the frame 4 may include a degas valved port 26 and/or an electrolyte fill valved port 28. The valved ports 26, 28 are configured so that when the port 26, 28 is in an open configuration, fluid can pass between the interior space 3 of the battery module housing 2 and the exterior, and when the port 26, 28 is in a closed configuration, fluid is prevented from passing between the interior space 3 of the battery module housing 2 and the exterior.

The frame 4 may include at least one sensor that is configured to detect an operating property of at least one cell 102 of the cell stack 114. For example, the frame 4 may include a voltage sensor 32 for detecting the charge state of a cell 102 or of the cell stack 114, a temperature sensor 34 for detecting a temperature of a cell 102 of the cell stack 112, and/or other appropriate sensors that facilitate monitoring and/or control of the cells 102 within the battery module housing 2.

Figure 4:
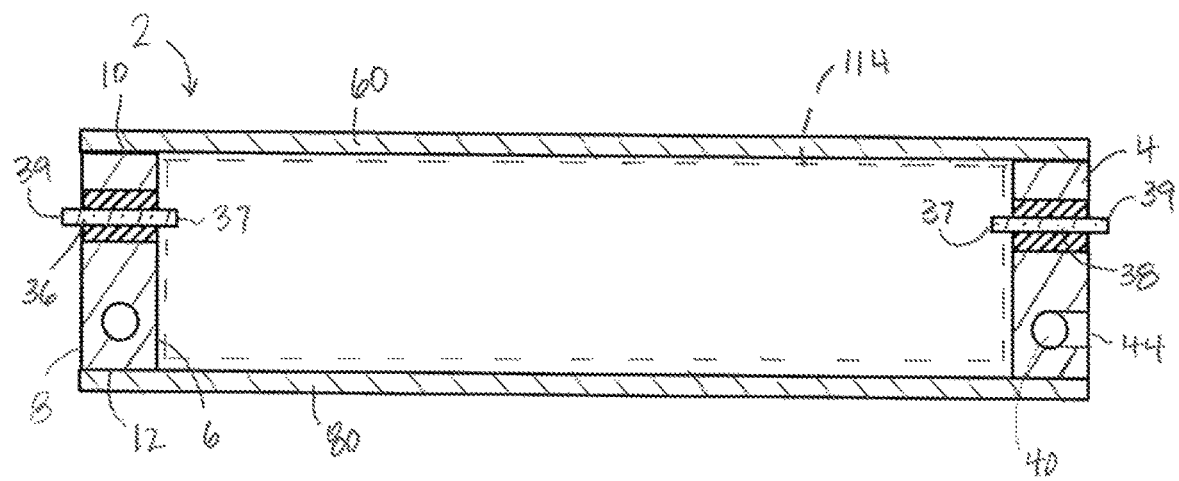
FIG. 4 is a cross-sectional view of the battery module housing as seen across line 4-4 of FIG. 1.
Figure 5:
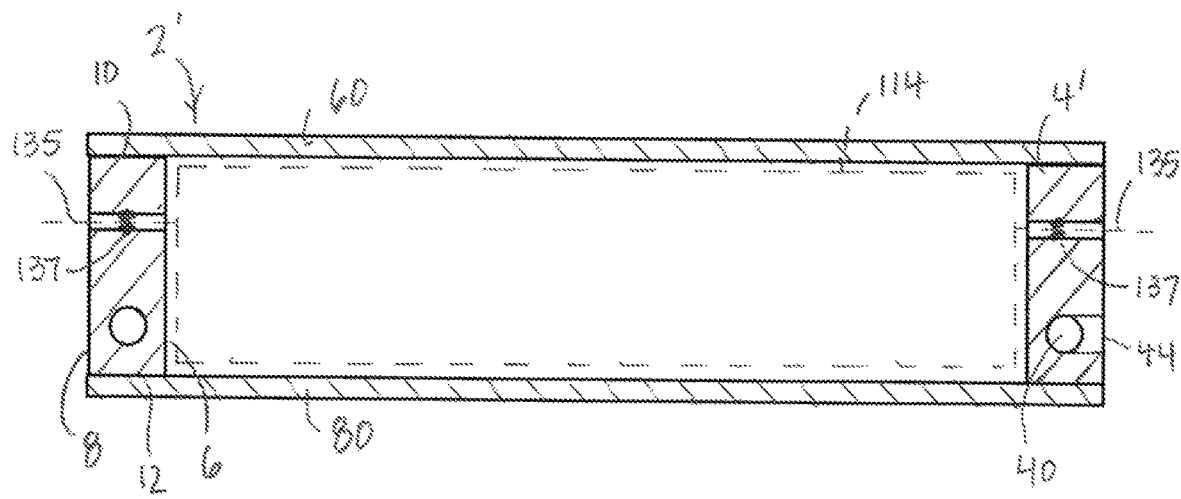
FIG. 5 is a cross-sectional view of an alternative embodiment battery module housing as seen across line 4-4 of FIG. 1.

Referring to FIGS. 1 and 4, in some embodiments, the frame 4 includes first and second electrically conductive terminals 36, 38. The terminals 36, 38 each include a first end 37 that protrudes inward from the inner surface 6 of the frame 4 and has an electrical connection with one of the positive electrode 106 and the negative electrode 108 of at least one cell 102. The terminals 36, 38 include a second end 39 that protrudes outward from the outer surface 8 of the frame 4 to permit electrical connection to an external structure. In other embodiments, the frame 4' does not include the terminals 36, 38 and instead includes a sealed pass-through terminal opening 136. The terminal opening 136 is shaped and dimensioned to receive a portion, for example, terminals or lead tabs 135 that protrude from one of the positive electrode 106 and the negative electrode 108 of at least one cell 102. The terminal opening 136 includes a seal such as a gasket 137 that prevents fluid flow through the terminal opening 136.

The frame 4 may include one or more integral mounting features 29 that are configured to allow the frame 4 to be secured to a support structure. In the illustrated embodiment, the integral mounting feature 29 includes a boss 30 that protrudes outward from the frame outer surface 8, and a through hole 31 centered within the boss 30 that extends between the first and second edges 10, 12. The through hole 31 is configured to receive a fastener (not shown) such as a screw.

Figure 6:
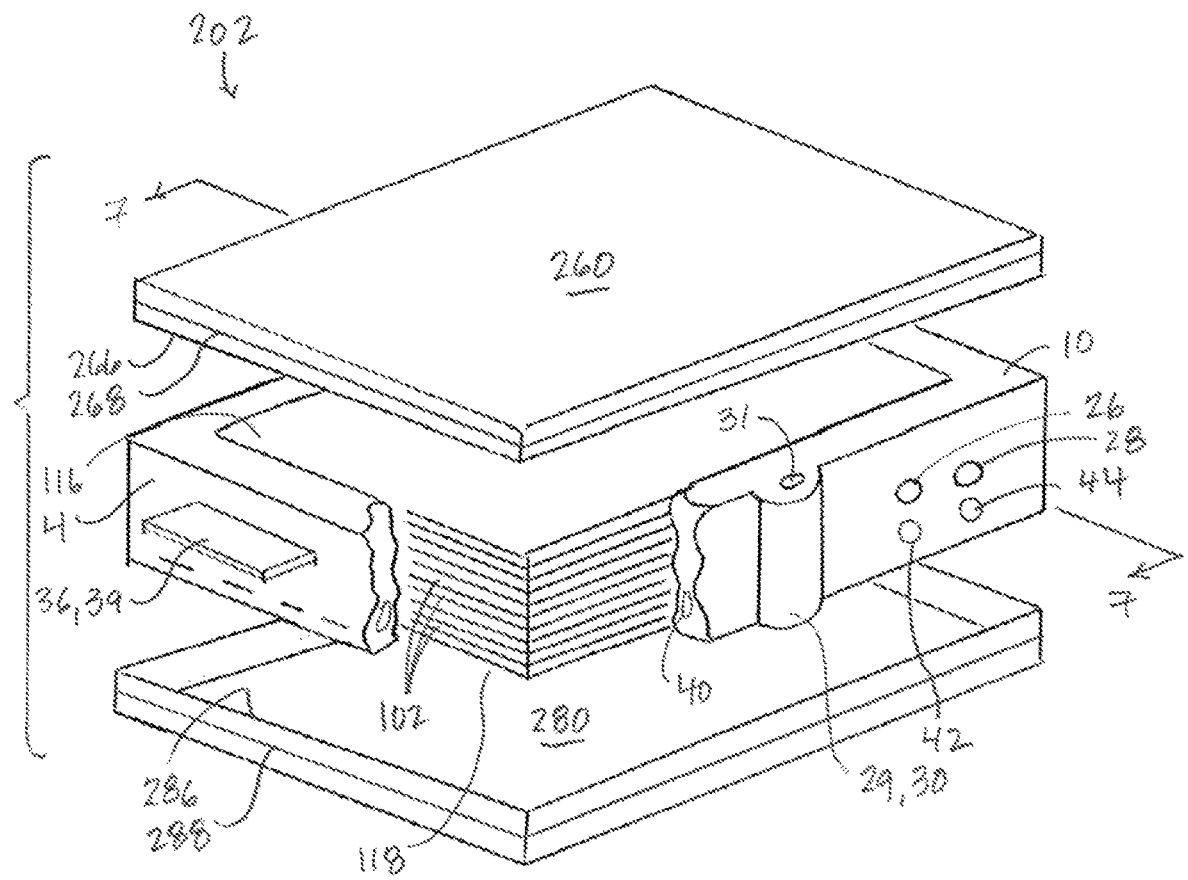
FIG. 6 is an exploded perspective view of an alternative embodiment battery module including an alternative embodiment battery module housing and a stack of electrochemical cells disposed in the housing.
Figure 7:
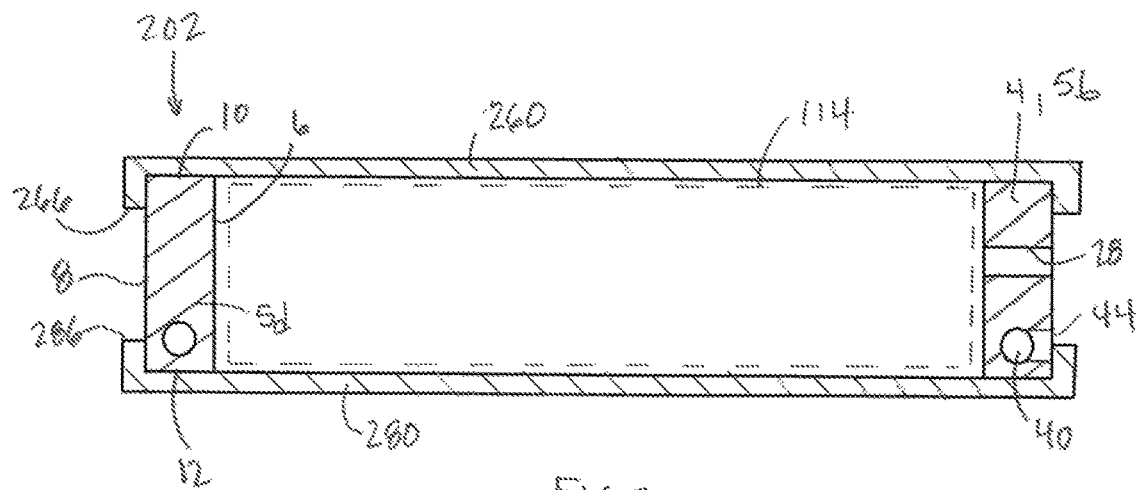
FIG. 7 is a cross-sectional view of the battery module housing as seen across line 7-7 of FIG. 6.

The frame 4 may include one or more cooling channels 40 that extends between a first cooling channel opening 42 and a second cooling channel opening 44. The first and second cooling channel openings 42, 44 open to the exterior of the frame 4, i.e., at the outer surface 8, and the cooling channel 40 defines a fluid flow pathway within the frame 4. The cooling channel 40 is configured to receive fluid such as air or a liquid coolant, and the fluid may flow through the channel 40 in a passive or actively-driven manner Referring to FIGS. 6 and 7, an alternative battery module housing 202 includes features in common with the battery module housing 2 illustrated in FIG. 1, and common elements are referred to with common reference numbers. The battery module housing 202 shown in FIG. 6 differs from the earlier-described embodiment in that it includes alterative first and second cover elements 260, 280. The first and second cover elements 260, 280 are dimensioned so as to extend beyond the first and second edges 10, 12 of the frame, whereby the peripheral edges 266, 286 of the first and second cover elements 260, 280 overlie and are sealed to the outer surface 8 of the frame 4. In particular, the first and second cover elements 260, 280 are joined to the frame 4 along seal lines 268, 288 that extend about the circumference of the frame 4 so as to form a closed loop.

Although the cells 102 described herein are pouch-type cells in which each cell 102 includes several positive and negative electrode pairs in stacked arrangement, the cells 102 are not limited to this electrode arrangement. For example, in some embodiments, the cell 102 may include a single, elongated electrode pair that is rolled to provide a "jelly roll" electrode arrangement, and housed in a cell housing. In other embodiments, each cell 102 has a single electrode pair separated by a separator and arranged in a stacked configuration. The single electrode pair may be housed in a cell housing, for example, a pouch type housing or a pouch-prismatic hybrid housing. Alternatively, the single electrode pair may be housing-free, with the electrodes serving as both the housing and the cell terminals.

Although the cells 102 described herein are pouch-type cells having a metal foil laminate cell housing 104 arranged to form a low profile, flexible pouch, the battery module housing 2 can accommodate cells having other types of cell housings, including prismatic and cylindrical.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the spirit and scope of this disclosure.

What is claimed is:

1. A battery module, comprising
    electrochemical cells arranged in a cell stack, each cell comprising a cell housing and an electrode assembly sealed within the cell housing, the electrode assembly including a positive electrode, a negative electrode and a separator, where the separator is sandwiched between the positive electrode the negative electrode and prevents physical contact between the positive electrode and the negative electrode,
    a rigid frame that surrounds a circumference of the cell stack, the frame having an inner surface that faces the cell stack, an outer surface that is opposed to the inner surface, a first edge that joins the inner surface to the outer surface at one end of the cell stack, and a second edge that joins the inner surface to the outer surface at an other end of the cell stack,
    a first cover element formed of a metal foil laminate material, the first cover element overlying the one end of the cell stack and a peripheral edge of the first cover element being joined to the frame along the entirety of the peripheral edge of the first cover element, and
    a second cover element formed of a metal foil laminate material, the second cover element overlying the other end of the cell stack, a peripheral edge of the second cover element being joined to the frame along the entirety of the peripheral edge of the second cover element,
    wherein the first cover element, the second cover element and the frame cooperate to form a module housing that contains the cell stack.

2. The battery module of claim 1, wherein
    the first cover element is sealed to the frame along the entirety of the peripheral edge of the first cover element, and
    the second cover element is sealed to the frame along the entirety of the peripheral edge of the second cover element,
    whereby the first cover element. the second cover element and the frame cooperate to form a sealed module housing that contains the cell stack.

3. The battery module of claim 2, wherein an interior space of the module housing is at a pressure that is less than atmospheric pressure.

4. The battery module of claim 1, wherein the frame comprises at least one port that is configured to permit fluid flow through the frame when the port is in an open configuration, and that is configured to prevent fluid flow through the frame when the port is in a closed configuration.

5. The battery module of claim 1, wherein the frame comprises at least one sensor that is configured to detect an operating property of at least one cell of the cell stack.

6. The battery module of claim 1, wherein the frame comprises an electrically conductive terminal, the terminal including a first end that protrudes inward from the inner suthce of the frame and is in electrical contact with one of the positive electrode and the negative electrode of at least one cell, the terminal including a second end that protrudes outward from the outer surface of the frame.

7. The battery module of claim 1, wherein
    the first cover element is joined to the first edge along the entirety of the peripheral edge of the first cover element, and
    the second cover element is joined to the second edge along the entirety of the peripheral edge of the second cover element.

8. The battery module of claim 1, wherein the frame comprises integral mounting features that are configured to allow the frame to be secured to a support structure.

9. The battery module of claim 1, wherein the frame comprises
    a terminal opening configured to permit pass through of a terminal that is electrically connected to at least one cell, and a seal disposed in the terminal opening configured to prevent fluid flow between the terminal and the terminal opening.

10. The battery module of claim 1, wherein the frame comprises a cooling channel that extends between a first cooling channel opening and a second cooling channel opening, the cooling channel defining a fluid flow pathway within the frame.

\* \* \* \* \*

UNITED STATES PATENT AND TRADEMARK OFFICE
CERTIFICATE OF CORRECTION

PATENT NO. : 10,734,618 B2
APPLICATION NO. : 15/832440
DATED : August 4, 2020
INVENTOR(S) : Christopher Millon Page 1 of 1

It is certified that error appears in the above-identified patent and that said Letters Patent is hereby corrected as shown below:

In the Claims

In Claim 2, at Column 8, Line 32, delete the "." between the words "element" and "the" and insert a --,-- in its place.

In Claim 6, at Column 8, Line 49, delete the text "suthce" and insert the word --surface-- in its place.

Signed and Sealed this
First Day of December, 2020

Andrei Iancu
*Director of the United States Patent and Trademark Office*